United States Patent [19]
Chan et al.

[11] Patent Number: 5,376,796
[45] Date of Patent: Dec. 27, 1994

[54] PROXIMITY DETECTOR FOR BODY CONTOURING SYSTEM OF A MEDICAL CAMERA

[75] Inventors: David A. Chan, Sunnyvale; Robert L. Kay, Thousand Oaks; Matthew J. Murphy, Santa Clara; Steven M. Jones, Pleasanton; Kenneth G. Bayer, Los Gatos; Paul Hug, Saratoga; Horace H. Hines, San Jose, all of Calif.

[73] Assignee: ADAC Laboratories, Inc., Milpiats, Calif.

[21] Appl. No.: 981,833

[22] Filed: Nov. 25, 1992

[51] Int. Cl.$^5$ .................. G01T 1/166; G01T 1/20; G01B 11/24
[52] U.S. Cl. .................. 250/363.04; 250/363.02; 356/376
[58] Field of Search ............... 378/87, 6; 250/363.02, 250/363.03, 363.04, 363.05, 363.07, 363.09; 356/376, 1

[56] References Cited

U.S. PATENT DOCUMENTS

| | | |
|---|---|---|
| 4,158,776 | 6/1970 | Barrett . |
| 4,239,961 | 10/1980 | Lasar . |
| 4,347,438 | 8/1982 | Spielman . |
| 4,417,143 | 11/1983 | Haas et al. . |
| 4,438,335 | 3/1984 | Meeder . |
| 4,445,035 | 4/1984 | Ueyama .................. 250/363.04 |
| 4,507,557 | 3/1985 | Tsikos . |
| 4,534,650 | 8/1985 | Clerger et al. .................. 365/376 |
| 4,593,189 | 6/1986 | Stoub .................. 250/363.04 |
| 5,072,121 | 12/1991 | Jazbec .................. 250/363.04 |
| 5,107,121 | 4/1992 | Lim et al. .................. 250/363.05 |

FOREIGN PATENT DOCUMENTS

| | | | |
|---|---|---|---|
| 278269 | 8/1988 | European Pat. Off. | 356/376 |
| 56-107183 | 8/1981 | Japan | 250/363.04 |
| 60-055212 | 3/1985 | Japan | 356/376 |
| 61-29704 | 2/1986 | Japan | 356/376 |
| 61-29709 | 2/1986 | Japan | 356/376 |
| 61-29710 | 2/1986 | Japan | 356/376 |
| 61-31905 | 2/1986 | Japan | 356/376 |
| 62-43507 | 2/1987 | Japan | 356/376 |
| 62-88906 | 4/1987 | Japan | 356/376 |
| 62-280602 | 12/1987 | Japan | 356/376 |
| 63-65308 | 3/1988 | Japan | 356/376 |
| 63-127106 | 5/1988 | Japan | 356/376 |
| 63-150610 | 6/1988 | Japan | 356/376 |
| 63-261103 | 10/1988 | Japan | 356/376 |
| 4-12290 | 1/1992 | Japan | 250/363.04 |
| 59-79879 | 5/1993 | Japan | 250/363.04 |

OTHER PUBLICATIONS

Gullberg, Grant T., et al., "Boundary Determination Methods for Attenuation Correction in Single Photon Emission Computed Tomography", Emission Computed Tomography: Current Trends–13th Annual Symposium on the Sharing of Computer Programs and Technology in Nuclear Medicine, *The Society of Nuclear Medicine, Inc.*, 1983, pp. 33–53.

*Primary Examiner*—Constantine Hannaher
*Assistant Examiner*—Edward J. Glick
*Attorney, Agent, or Firm*—Blakely, Sokoloff, Taylor & Zafman

[57] ABSTRACT

A direct measurement system for proximity detection of a body profile for use within nuclear medicine. The measurement system includes two or three proximity detector units mounted on a gantry structure of a nuclear medicine camera which each emit an energy beam which is swept across a portion of a target body. Each detector is capable of directly measuring the distance from the proximity detector unit to the target body with a beam sample. The detectors then create a body profile of the target body which is used to minimize the distance between the collimator of a scanning camera and the target body surface thus improving image quality of the scanning camera. There is relative motion between the object and the gantry along a cranial-caudal axis of a target body for scanning successive body profiles. Successive body profiles are combined together to achieve a complete body contour of the target body. The proximity detector units are stationary with respect to movement of the scanning camera toward said target body. Body contour data is also used for attenuation correction.

58 Claims, 7 Drawing Sheets

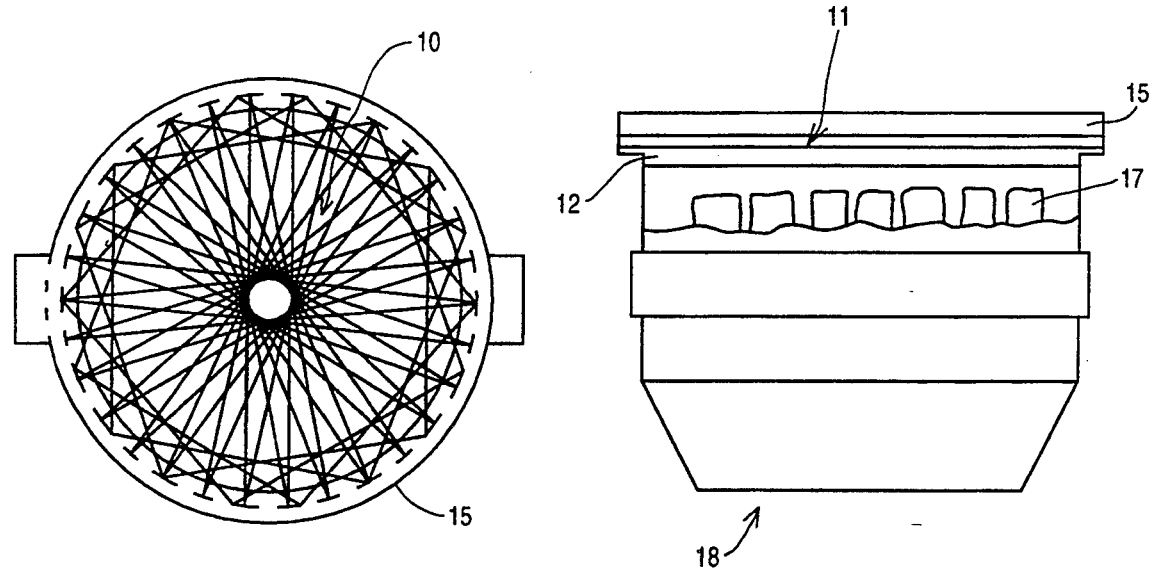
FIG_1A
(PRIOR ART)
FIG_1C
(PRIOR ART)
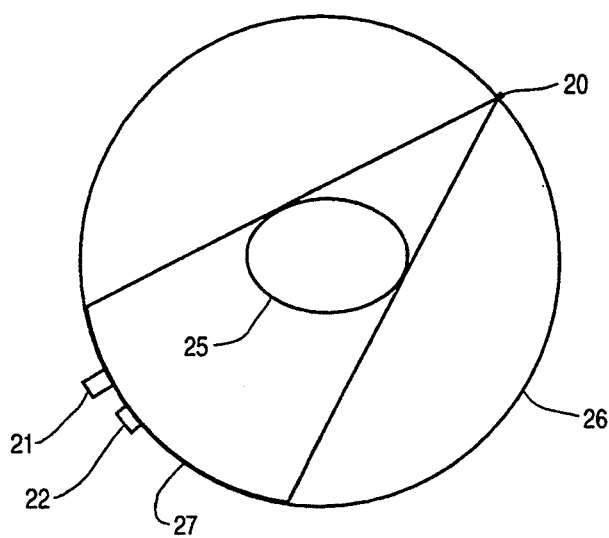
FIG_1B
(PRIOR ART)

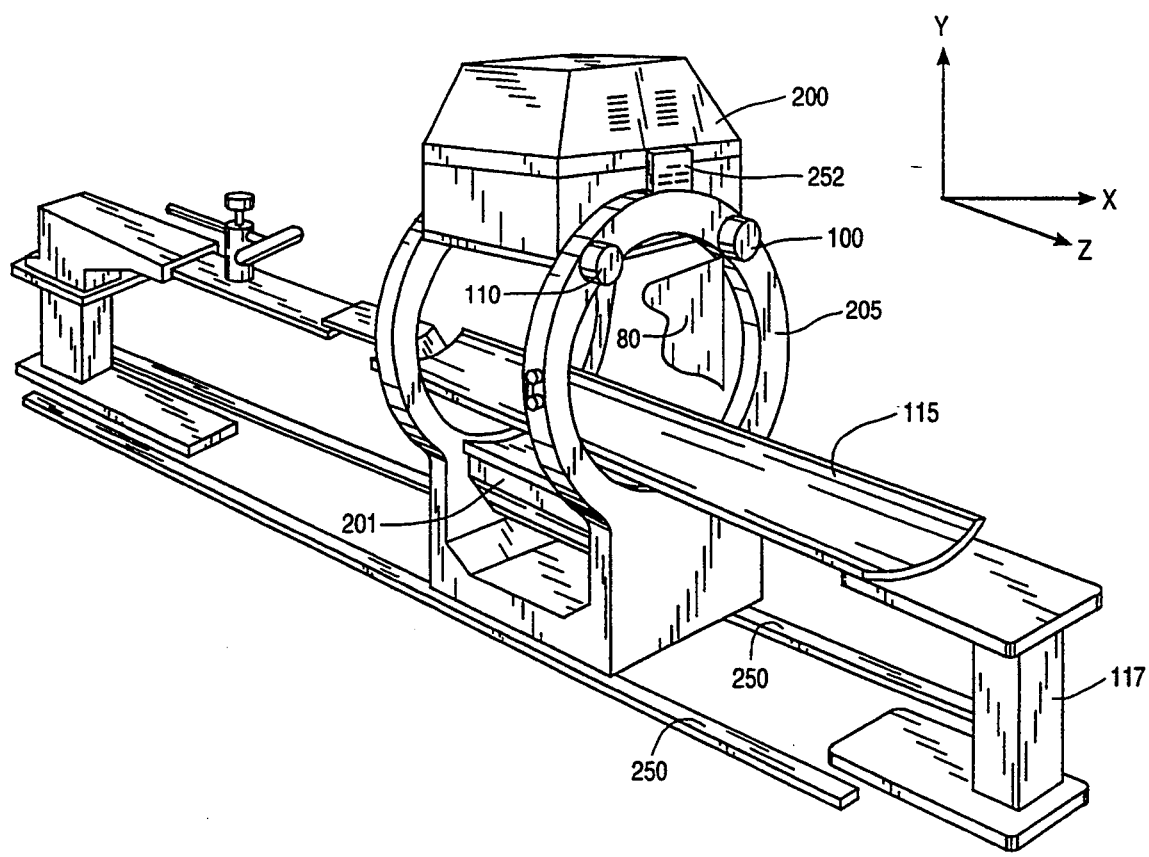
FIG_2

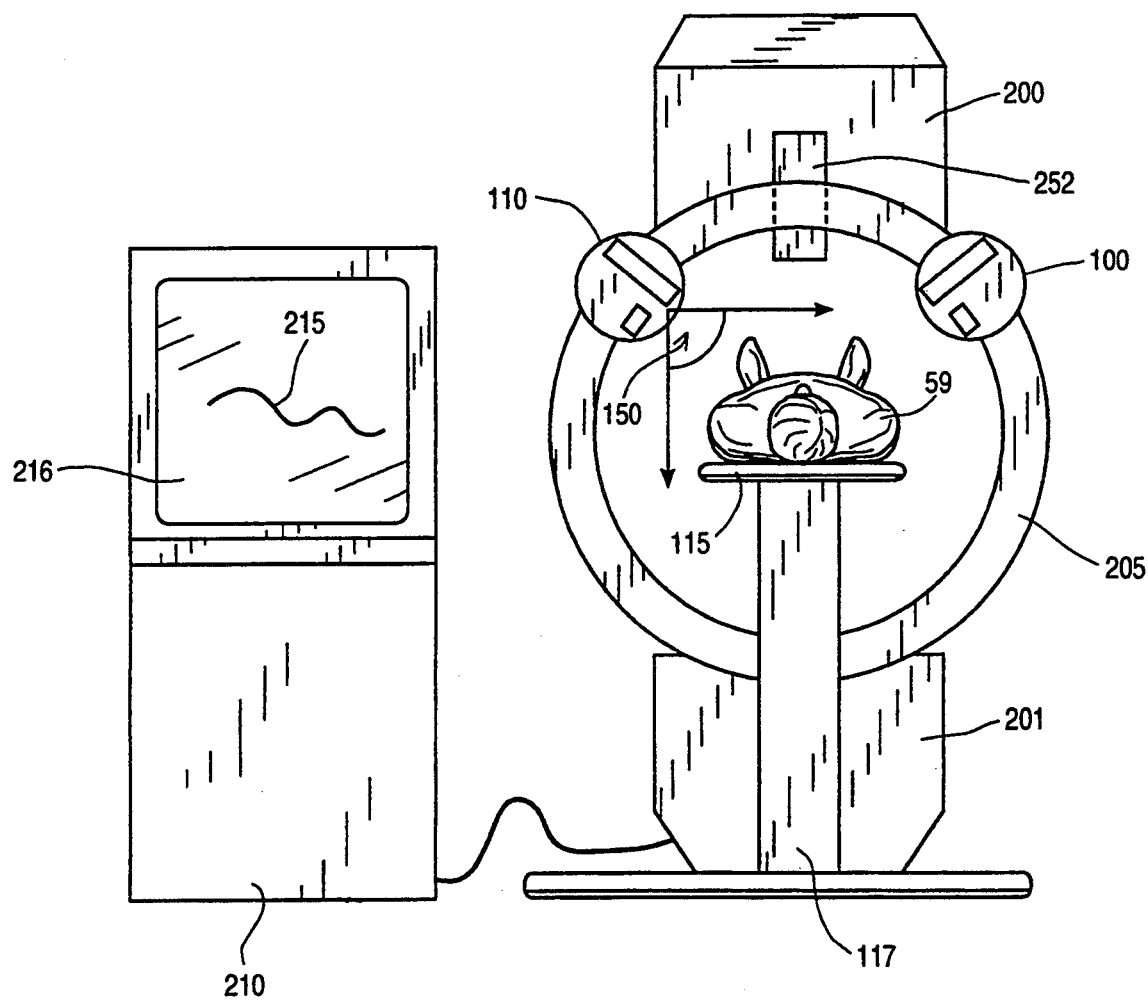
FIG_3

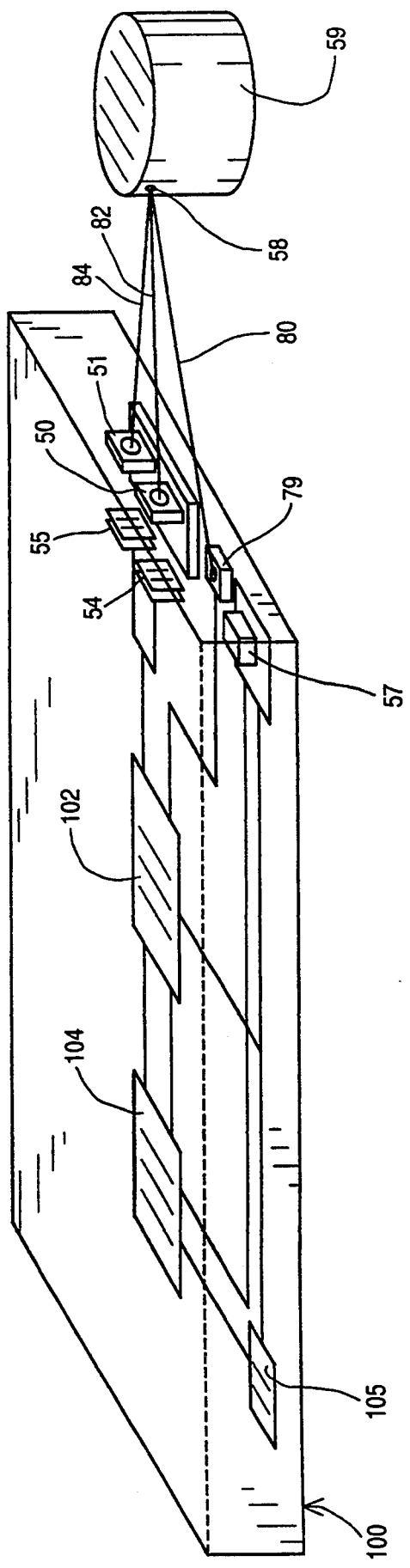
FIG_4

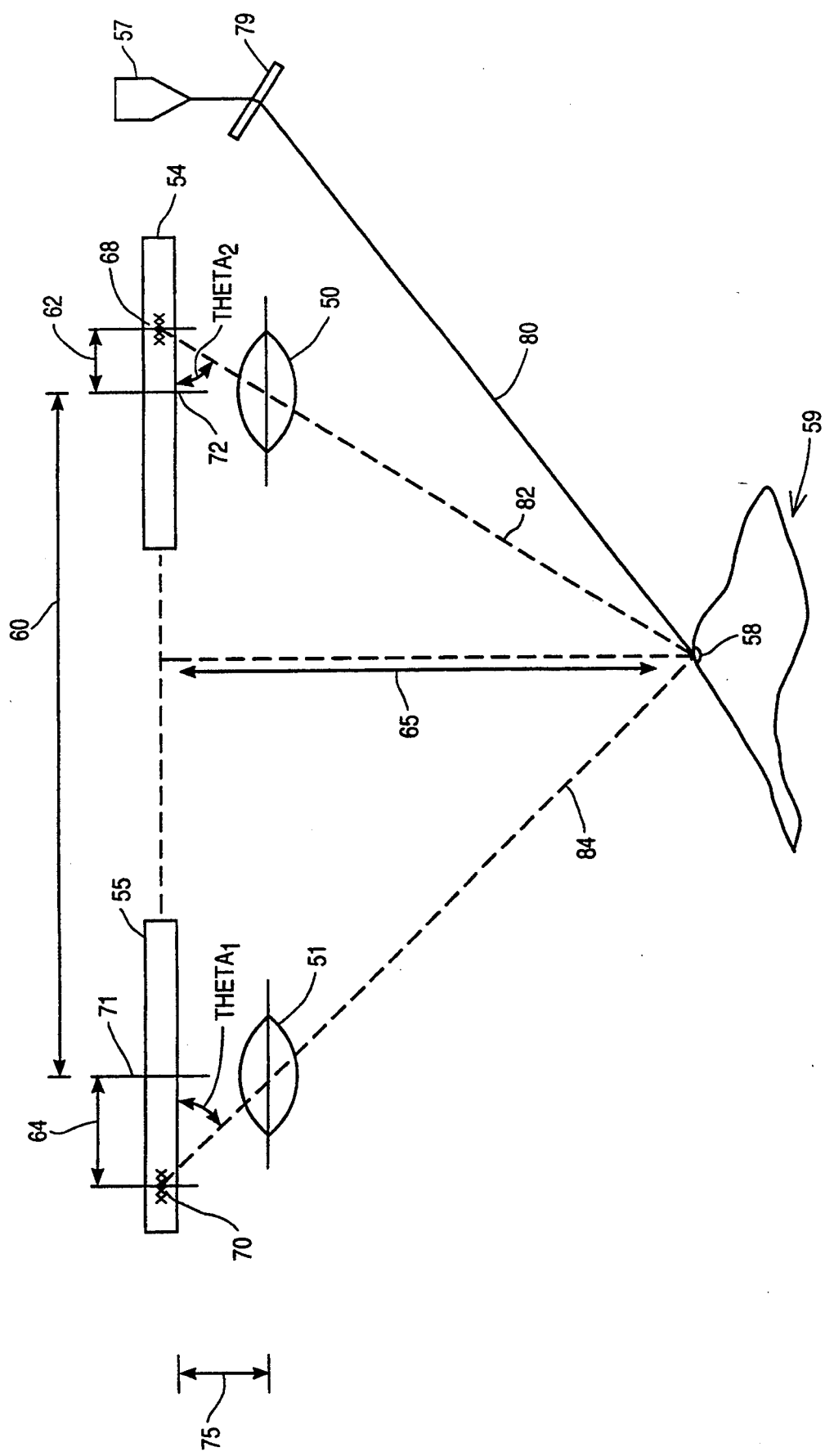
FIG_5

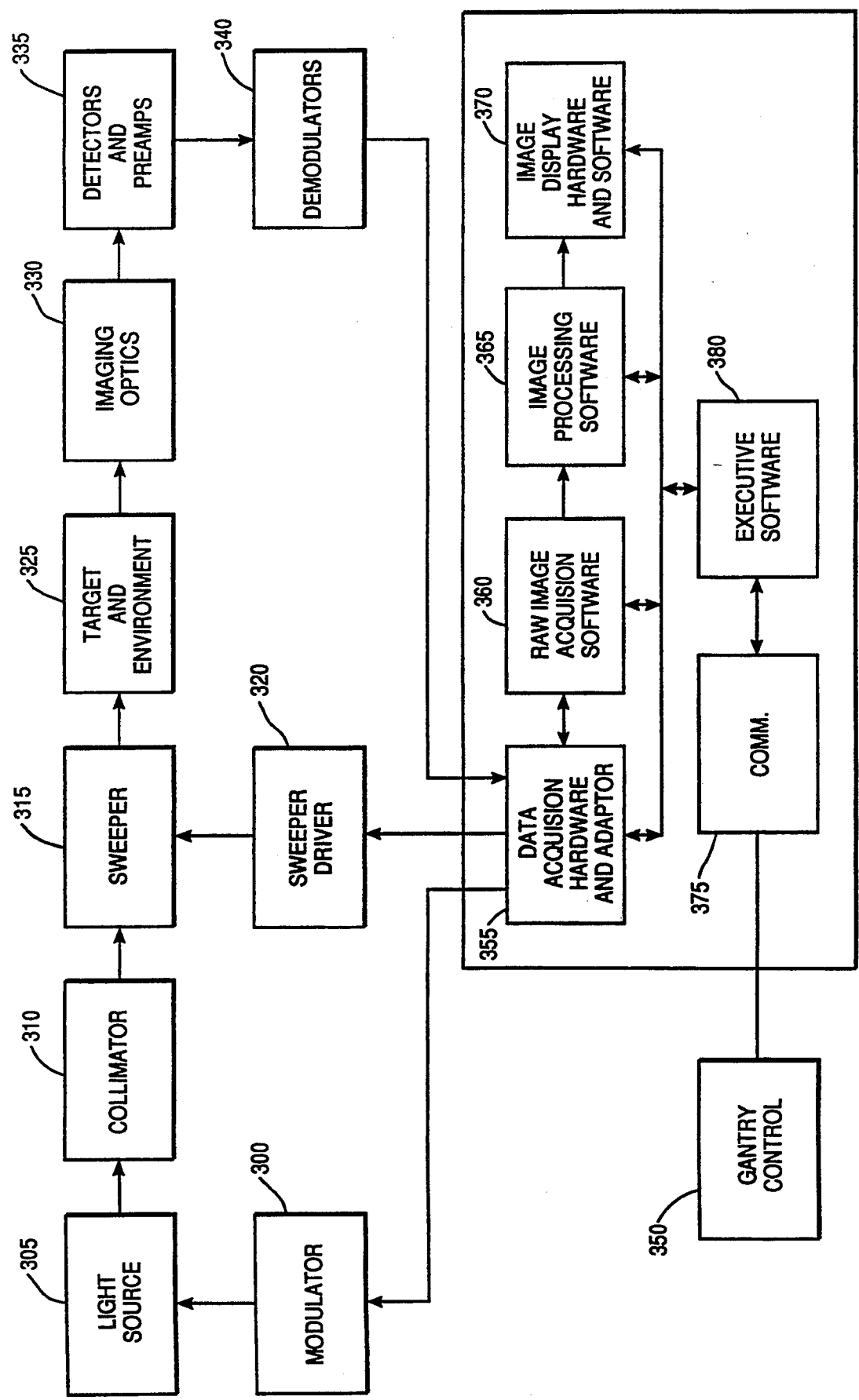
FIG_6

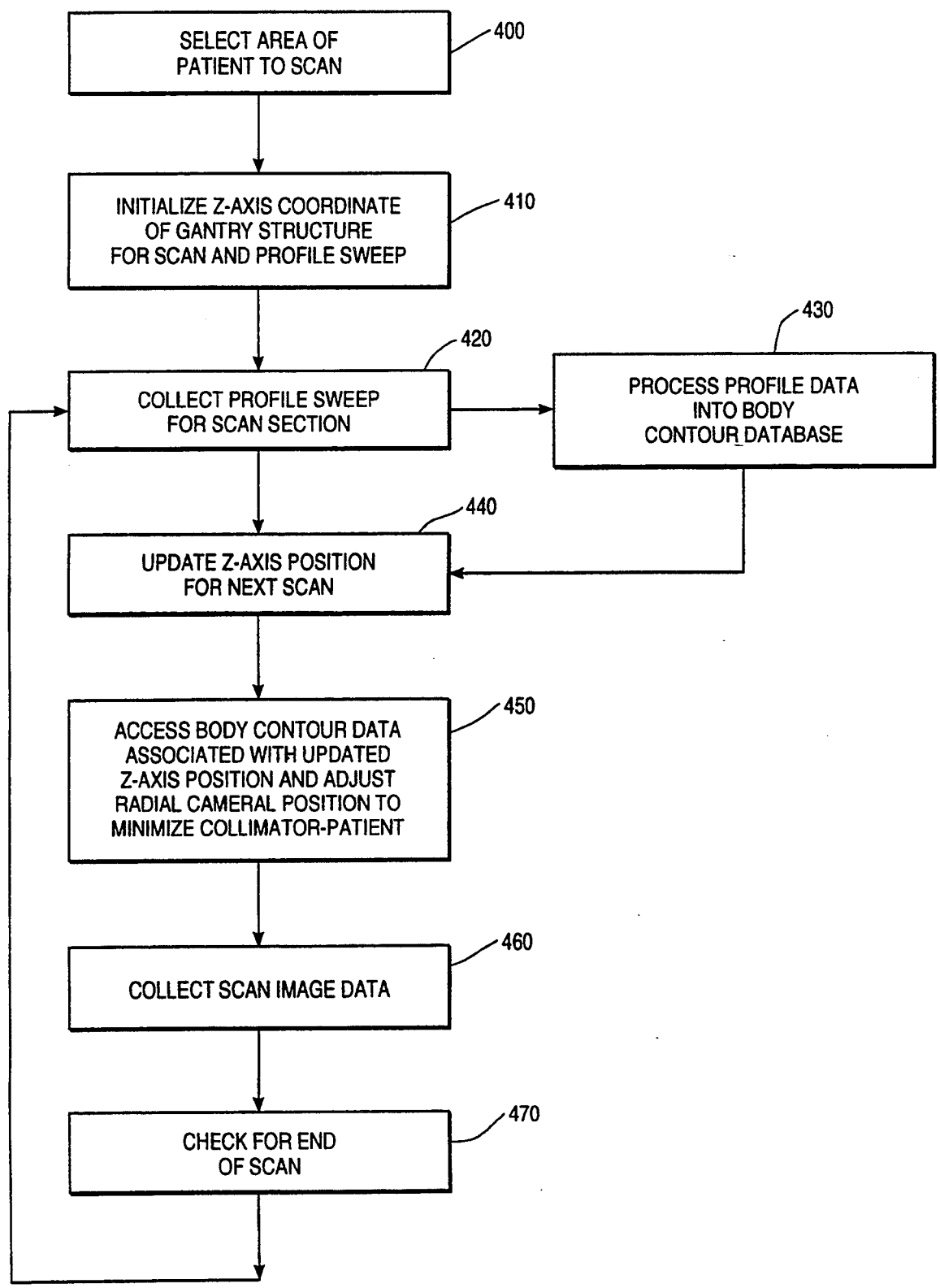
FIG_7

PROXIMITY DETECTOR FOR BODY CONTOURING SYSTEM OF A MEDICAL CAMERA

BACKGROUND OF THE INVENTION

1. Field of the Invention

The present invention relates to the field of determining the contour of a target body for imaging. Specifically, the present invention relates to body proximity detection for use within a gamma camera (nuclear medicine camera)for medical imaging for ECT imaging operations and for total body imaging operations.

2. Prior Art

Gamma detection cameras, also called gamma cameras, are used for medical imaging of particular body tissues, organs, or bone that may otherwise not be available for examination. In a typical medical camera of this sort, a special gamma ray emitting radiopharmaceutical is injected into the body area of interest in front of the patient and the patient is then placed within the medical camera's imaging surface. As is well known, the radiopharmaceutical emits gamma rays which are then detected by the gamma camera as a series of scintillations from a specialized crystal layer. Before the gamma rays reach the crystal they travel through a collimator which allows only those gamma rays which travel along the collimator's orientation. A matrix of photomultiplier tubes is optically coupled to the crystal layer to receive the scintillations within the crystal layer and converts these scintillations into electrical signals indicating a spatial coordinate of the gamma ray interaction. By using computers and other processing equipment to manipulate and plot the signals from the photomultiplier tubes, an image of the organ containing the radiopharmaceutical can be obtained and displayed for examination and diagnosis. If this type of nuclear medicine camera system rotates around the patient, it is called a single photon emission computed tomography or SPECT system. The surface of the gamma camera which receives the gamma rays from the patient is called the imaging surface or the detector surface. Since the collimator of the gamma camera is the first or outermost layer of the gamma camera, the collimator surface is commonly referred to as the imaging surface of the camera.

In practice for an ECT scan a patient is placed horizontally into a central location while a gamma camera rotates (transaxial rotation) around a predetermined portion of the patient to collect a number of data (projections). The projections are reconstructed into traverse slices. This "ECT" rotation is orthogonal to the cranial-caudal axis of the patient. The resultant data slice is then a cross-section of the patient or target organ (or bone) at the predetermined location along the cranial-caudal axis of the patient. A total body scan is a different scan technique than the ECT scan. For a total body scan, the gamma camera moves (translates) along the long (cranial-caudal) axis of the patient usually at the anterior or posterior orientation along the patient and no rotation of the imaging surfaces is done during the translation for a total body scan. As the camera surface translates, it collects the radiated gamma rays from the area where the radiopharmaceutical is concentrated. In SPECT and total body imaging to obtain best quality images, it is desired to place the collimator as close as possible to the patient's outer surface. It is universally understood that when the collimator to patient distance is minimized better image resolution develops. Prior art systems have attempted to determine and utilize information about body profiles or contours of the patient in order to minimize the distance between the camera imaging surface and the patient. With the body profile data, the camera imaging surface is adjusted to arrive at the minimum distance. For this reason it would be advantageous to develop a system to constantly and automatically minimize the distance between the camera imaging surface and the patient during the ECT and total body scan process. The present invention allows for such capability.

Prior art systems of proximity detection, as described in U.S. Pat. No. 4,593,189, have placed a "web" or planar array of beams in a plane located just in front of, and parallel to the imaging surface of a gamma camera as shown in FIG. 1(A) and FIG. 1(C). FIG. 1(A) and FIG. 1(C) illustrate side and frontal views of a gamma camera scanning detector 18. As shown in the side view, there is a collimator surface 11, behind which is located crystal layer 12 and a matrix of receiving photomultiplier tubes 17. Located in front of the collimator 11 is a small reflection ring 15. This reflection ring 15 is used to create a dense set of beams which surround the front surface of the imaging surface of the gamma camera. FIG. 1(A) also illustrates an inward frontal view of the gamma camera detector 18 perpendicular to the imaging surface of the gamma camera 18. This view is looking into the imaging surface or collimator 11. As shown, reflector ring 15 is a circular ring with a U-shaped cross-section. There are two laser beam emitters which are directed angularly onto the reflection ring 15 causing a "web" or dense set of planar beams 10 to surround the imaging surface of the gamma camera. Because the beams are located in a plane parallel to and in front of the imaging surface 11 of the camera, they comprise the outermost portion of the camera detector 18 as shown in the side view of layer 15 and increases the collimator to patient distance.

Referring still to the prior art design of FIG. 1(A) and FIG. 1(C), in operation the camera detector 18 is mounted on a movement device or gantry. In an effort to minimize the distance between the collimator 11 and the patient, the camera detector 18 urges forward toward to the patient until a part of the patient impinges within the reflector ring 15. When this happens, most likely a beam of web 10 will become interrupted or weakened by the impinging object thus causing the camera detector to back away from the patient until the light beam is no longer interrupted. Using a feedback processor, the camera of this prior art design moves toward and away from the object during the ECT scan depending on whether or not a light beam of web 10 has been interrupted by the scan object. This prior art design is disadvantageous for a number of reasons. Most importantly, the mandatory presence of the detecting surface in front of the collimator reduces the resolution obtainable by the prior art system by increasing the scanning distance between the collimator and the patent. This system is not advantageous because it does not directly measure the profile of the target object. Also, this design requires a proximity detector for every camera detector in a multi-detector camera design. Also, this design does not actually calculate an object profile but performs multiple "trial and error" movements for proximity detection which are wasteful and could become haphazard. This approach can be very inefficient and time consuming while only giving minimal proximity information. It would be advantageous to be able to directly calculate the profile of a patient before the scanning operation is performed so that the gamma camera imaging surface 11 can be precisely adjusted to a close, predetermined, proximity with respect to the patient.

Another prior art design for proximity detection, as disclosed within U.S. Pat. No. 5,072,121, is illustrated within FIG. 1(B). This is a side view of the overall camera structure showing the side view of the circular gantry as the outer circle 26. The gamma camera detectors (not shown) of this design are located above and below the target object patient 25. The body of patient 25 is shown in a cross-sectional view surrounded by a side view of gantry 26. Surrounding the patient, and located in a circular ring near the gantry structure 26 are a series of emitters 20 which emit a light beam arc toward corresponding detectors 21 and 22 which are also located on the same circular ring. Each emitter 20 illuminates the patient with a light beam and thus creating a shadow 27 of the patient on the circular ring where the patient interrupts the beam. The emitters are sequentially pulsed so that there is a different shadow for each emitter as well as an illuminated portion where the beam is not interrupted. A series of detectors located on the circular ring detect the location of each shadow. A sequence unit controls the sequential firing of a series of these emitters located around the patient and therefore a series of shadow regions are produced depending on the characteristics of the patient. By calculating all the shadow positions for each emitter, some contour information can be configured by the prior art system.

The prior art design illustrated in FIG. 1(B) is disadvantageous because of the plurality of emitters and detectors required for the design. Along the ring 26 there must be at least a series of many detectors and many emitters which is costly and complex to manufacture and implement. Also, the resolution of the contour data obtainable by such a system is limited by the number of detectors 21, 22 placed on the outer ring 26. For each emitter and detector series only the shadow position (along the ring 26) of the object can be known. Also, patients having an asymmetrical body profile, such as patients having breast removal, may generate false profile data as the asymmetrical nature of the object 25 will cause shadowing which will hide important features of the true body contour under this prior art system. Also, partial profiles are not obtainable by direct measurement within this prior art system because shadows, not data profile points, are detected. What is needed is a system that can directly measure the body profile from a radial position at each point along the patient. Using such a system a true patient profile and contour can be determined and collected thus improving image quality. The present invention offers such capability.

Prior art system as described in U.S. Pat. No. 4,445,035 utilizes ultrasound emitters and detectors for proximity detection by placing four ultrasound emitters on the edge of the imaging surface of the ECT camera. The prior art system of this type measures the difference in time between the emitted ultrasound signal and an echo signal reflected from the target to determine a distance between the camera surface and the target. The prior art design is disadvantageous because proximity measurements are determined at each of the ECT imaging surface, which is a variable position reference point. Therefore, each time the ECT imaging surface moves in circular positions during the ECT scan cycle, new proximity measurements are required. This means that extra motions are required since the detector must move to the maximum diameter since there is no prior knowledge of the patient contour. What is needed is a system which does not require re-measuring the proximity data for a given target profile each time the camera imaging surface is moved through an ECT movement. The present invention offers such a system. In addition, this prior art system is not able to be readily constructed utilizing ultrasound technology when the medium surrounding the patient is air since air is not a good conductor of an ultrasonic signal. For this reason, the prior art system as disclosed may not be readily implemented with current technology and apparatus. This reference indicates substituting laser beams for the ultrasound emitters but fails to provide disclosure of a system capable of measuring the difference in time between the incident and reflective light beam and translate this difference into a spatial position value. Assuming such a system could be implemented, under current technology the radial resolution could only be determined to a crude $+/-10$ cm. Resolution at $+/-10$ cm would not offer any image quality improvement. This reference fails to disclose a system for measuring proximity information using infrared emitter device, receiving optics utilizing angular calculations. The present invention offers a system that may be readily implemented using currently available technology.

Therefore, it is an object of the present invention to provide a means for high resolution direct measurement of the data points constituting the contour of a patient imaged by a medical camera. It is an object of the present invention to advantageously utilize this profile data to construct a body contour of the patient. It is furthermore an object of the present invention to utilize the body contour data to control the proximity of the medical camera imaging surface so that the distance between the patient and the camera imaging surface is minimized thus improving overall image quality of the resultant display. It is furthermore an object of the present invention to utilize the body contour database for attenuation correction to further improve image quality. It is also an object of the present invention to accomplish the above using a system which does not require overly complex and costly structures and/or operations; it is an object of the present invention to operate in real-time. Other objects of the present invention not herein specifically mentioned will become clear according to the detailed description of the present invention to follow.

SUMMARY OF THE INVENTION

The present invention includes a system to directly measure the profile of a target object to create a body contour database used to adjust the imaging surface of an ECT camera to minimize the distance between this imaging surface and the target object.

One embodiment of the present invention relates to an apparatus in a nuclear imaging system having at least one imaging surface, a gantry structure, a gantry control unit coupled to the imaging surface for movement of the imaging surface and an axial track coupled to the gantry structure for moving the structure along the patient, wherein an apparatus for profile determination of an object comprising: electromagnetic energy emitter means for generating a single energy beam; sweeping means optically coupled to receive the single energy beam, the sweeping means for sweeping the single energy beam across a plurality of points of the object in a plane across a cranial-caudal axis of the object; electromagnetic energy detector means for detecting intensity and position of illuminating electromagnetic energy of the single energy beam; focusing means for focusing incident electromagnetic energy reflected from the object onto the electromagnetic energy detector means; and proximity calculation means for directly computing locations of each of the plurality of points of the object based on reflected electromagnetic energy from the each of the plurality of points of said object, the proximity calculation means coupled to the electromagnetic energy detector means, the proximity calculation means for computing the location of the plurality of points by determining angles of the incident electromagnetic energy on the focusing means.

The present invention as described above further includes: a computer processing means coupled to the proximity calculation means, the computer processing means for storing the locations of the plurality of points of the object to create a surface profile database of the object; and gantry control means communicatively coupled to the computer processing means and coupled to the gantry control unit for analyzing the surface profile database and based thereon for controlling the gantry control unit to adjust a position of the imaging surface to minimize a distance between the imaging surface and the object.

BRIEF DESCRIPTION OF THE DRAWINGS

FIG. 1(A) and FIG. 1(C) are an illustration of a first prior art proximity detection system showing a frontal end view of the dense set of planar beams and also showing a side view of the gamma camera detector.

FIG. 1(B) illustrates a second prior art system for proximity detection by showing a frontal end view of the gantry of the overall camera system.

FIG. 2 illustrates the overall view of the proximity detection and body contour system of the present invention as integrated within a gamma camera structure of the present invention.

FIG. 3 is an axial view of the end of the gamma camera structure of the present invention illustrating the placement of the proximity detector units along the gantry structure and the computer processing system interface.

FIG. 4 is a breadboard diagram of a proximity detector unit of the present invention in relation to a sample target.

FIG. 5 is a diagrammatic illustration of the proximity detection technique advantageously utilized within the present invention.

FIG. 6 is an operational and structural flow diagram of the overall flow of the preferred embodiment of the present invention.

FIG. 7 is a computer flow diagram illustrating processing of the computer processing system of the present invention.

DETAILED DESCRIPTION OF THE INVENTION

The preferred embodiment of the present invention includes an apparatus and method for directly measuring a body profile from a fixed position to construct a body contour used in imaging for a nuclear camera. The body contour information is then advantageously utilized to control the proximity of a camera imaging surface so that the distance between the camera surface and the body is minimized to improve resultant image quality. The preferred embodiment of the present invention operates within the environment of a gamma camera (ECT) system and a total body system; however it should be appreciated that a number of medical or other varieties of cameras requiring such proximity information and resultant camera alignment (provided by the present invention) could equally utilize the advances offered by the present invention and would be considered within the scope of the present invention. Therefore, the present invention should not be viewed as solely limited to the environment of a gamma camera. However, for a complete discussion, the preferred embodiment of the present invention is described in detail herein with relation to a nuclear medicine ECT camera system and a total body imaging camera system.

In the following detailed description of the present invention numerous specific details are set forth in order to provide a thorough understanding of the present invention. However, it will be obvious to one skilled in the art that the present invention may be practiced without these specific details. In other instances, well known methods have not been described in detail as not to unnecessarily obscure the present invention. It is appreciated that the term "radial" and "radially" throughout this discussion includes radial motion within the indicated XY plane and which may also include some Z component of displacement. Therefore, radial movement is to be understood to include a Z translation component in some instances.

FIG. 2 illustrates an overall perspective view of a gantry for a medical camera for the present invention. The gantry is a supporting structure which provides a mounting and alignment surface for elements of the present invention. The circular portion of gantry structure 205 provides support for a gamma camera detector 200 and a camera detector counterweight 201. The base of the gantry is located on tracks 250. A table 115 runs through the gantry structure 205 to provide support for a patient or for any target object; in the nuclear medicine field the target object is typically a patient. Gantry structure 205 allows upper gamma camera detector 200 and lower counterweight 201 to pivot circularly around the patient when the patient is located on table 115. The imaging surface of gamma camera 200 is a rectangular area approximately 22 inches by 27 inches wide. However, the active region of the imaging surface is 15 inches by 20 inches. Table 115 is supported by base 117. Located and fixed on the circular gantry 205 are two proximity detector units 100, 110 of the present invention which detect profile data associated with a cross-section of the patient located under the two proximity detector units. Each proximity detector unit casts a sweep beam 80 which covers a portion of the target for proximity detection.

The entire gantry structure 205 is capable of moving in the directions of tracks 250, under direction of a gantry actuator, to cover the entire body of a patient reclined on table 115. Since the gantry structure is capable of translating along track 250 and gamma camera detector 200 is capable of pivoting around gantry circular structure 205, the surface of a patient may be completely scanned by these two motions. The ECT operation includes the rotation of the detectors as they pivot around the gantry circular structure 205 and the total body scan operation includes the translation along track 250 of the detectors. The table 115 is also capable of moving the patient, if required. A three dimensional coordinate system (X, Y, Z) is shown for reference with the proximity determination system. The gantry structure 205 exists parallel to the XY plane while the gantry system moves along the Z axis up or down track 250. Therefore, according to this coordinate system, each separate body profile resides within the same XY plane and is associated with the same Z coordinate.

Referring still to FIG. 2, the gamma camera detector 200 is also capable of radial movement inward and outward, toward the patient and away from the patient by gantry control unit 252. When the surface of a gamma camera detector is moved radially toward the patient or away from the patient, this is called radial movement. As discussed above, the radial movement may have two movements in alternative designs, one having a Z component. When the gamma camera detector 200 is moved in a circular motion around gantry 205 this is called ECT movement. When the gantry structure moves along track 250, along the cranial-caudal axis of the reclined patient, this is called total body or cranial-caudal axis movement of the gamma camera detector. Therefore, throughout this discussion reference will be made to radial movement, cranial-caudal axis movement and ECT movement of the gamma camera detector of the present invention.

For each Z position of the gantry system along track 250, the proximity detector units 100, 110 as shown in FIG. 2 provide profile proximity information to construct a body contour of the patient. Typically a single profile of data represents the width of the patient in cross-section and is one centimeter wide in the preferred embodiment of the present invention, but this value is arbitrary and could be set to a smaller or larger resolution depending on the movement of the gantry along track 250. Combining successive body profiles together will yield a three dimensional body contour of the imaging surface of the patient. Generally, as the gantry system moves down the cranial-caudal axis of the patient, the proximity detectors 100, 110 construct a body contour of the patient composed of successive profiles. This information is processed in real time and fed to a gantry control unit 252 which is capable of adjusting the radial positions of the camera detector 200 and also capable of adjusting the position of the table 115 to thereby minimize the distance between the collimator or imaging surface located on the camera detector and the patient. Since the camera detector 200 follows behind the proximity detectors 100, 110 down track 250, the pertinent proximity information is collected, processed and fed to the gantry control unit 252 before the camera 200 is over the next scan profile area. In so doing, camera detector 200 can be properly aligned to the patient at the requisite minimum distance just before the camera is ready to perform the ECT or total body scan.

FIG. 3 illustrates an end perspective view of the structure of the present invention as shown in FIG. 2. Camera detector 200 is illustrated in a radially extended position and the circular portion 205 of the gantry structure is shown in a frontal view. Counterweight 201 is illustrated below. It should be appreciated that the present invention also may operate within a dual camera system wherein the counterweight 201 would actually be a second gamma camera detector. An embodiment of the present invention utilizes two proximity detectors 110 and 100 primarily to gather the profiles of the patient, 59, illustrated in a cross-sectional view on top of the table 115 and supported by base 117. The proximity detectors 110 and 100 are both located approximately (33 to 80) degrees from the top center of the circular section 205 of the gantry. The two proximity detector units are spaced approximately 28 inches apart. After the gantry is moved in the cranial-caudal axis and rests at a new Z position, proximity detector unit 110 generates a profile for the left hand side of the patient while the proximity detector 100 generates a profile for the right and side of patient 59. In this fashion the present invention can obtain a profile of the surface of the patient 59 for the upper 180 degrees of the patient surface for the cross-section under the proximity detector units. When a profile is complete, the gantry system moves down track 250 over a new cross-section for a new successive profile sweep. The embodiment of the present invention which places two proximity detectors underneath the object is capable of additionally obtaining the lower 180 degree profile.

It is appreciated that embodiments of the present invention include additional proximity detectors located on the gantry structure and oriented below the patient in order to gain profile data of the posterior side of the patient. It is further appreciated that discussions of the present invention referring to the proximity detector units located above the patient apply equally to the embodiment of the present invention having proximity detector units located above and below the patient in order to gain 360 degree profile data.

It is further appreciated that other embodiments of the present invention may utilize three proximity detector units situated above the object to increase coverage of the overall system. Referring to FIG. 3, in this embodiment two of the three proximity detector units are placed similarly to proximity detector units 100, 110 as shown. A third proximity detector unit (not shown) is located on the gantry 205 in between the detector units 100, 110. The third proximity detector unit, in combination with the other proximity detector units 100, 110 adds to the object profile coverage of the overall system. The added proximity detector unit is analogous in content as the other proximity detector units 100, 110. Further, the added proximity detector communicates with the computer system in an analogous manner as the other two proximity detector units.

Each proximity detector unit 100, 110 of the present invention is capable of sweeping an energy beam across one side of the patient 59 and collecting reflected beam energy. The reflected beam energy enters the detector's field of view 150. A typical field of view 150 is illustrated in FIG. 3 for the left proximity detector 110. A swept profile resides within the field of view of a detector. These profile sections are then fed to a computer processing system 210 which converts signals from the proximity detectors 110 and 100 into three dimensional coordinates (X,Y,Z). The computer system 210 also combines all of the individual (successive) profiles in order to construct a body contour of the entire portion of the patient surface that has been processed by the proximity detector units 100, 110. A representative single profile 215, corresponding to the illustrated cross-sectional portion of patient 59, is illustrated on display device 216 of the computer processing system 210.

Each profile 215 collected by the proximity detectors 100 and 110 represents distance measurements from the proximity detector unit to the surface of the cross-section of patient 59 within the detector's field of view. Using this distance measurement, a true coordinate location of that patient's surface can be determined, this is also called the height of the patient at the particular cross-section. In order to perform the proximity detection several elements are positioned within a proximity detector unit of the present invention. Located within each proximity detector unit is a radiation emission device, such as an infrared laser or LED or other electromagnetic energy emission device, and also a pair of energy sensitive detectors. The energy beam is swept across the patient at approximately a 90 degrees arc, for instance, across field of view 150 for proximity detector 110, and the reflected energy is captured at points across the patient in order to directly measure, at each individual point, the profile of the patient. Approximately 200 points across the width of the patient's surface are sampled to create one profile 215. Therefore, the present invention allows for direct measurement of the distance between a fixed proximity detector unit 100, 110 and the outer surface of the patient 59.

Referring still to FIG. 3, computer processing system 210 also controls the gantry control unit 252. Based on the scanned and recorded contour data of the patient corresponding to the current location (Z-axis) of the gamma camera detector 200 over the patient, the computer processing system 210 directs the gantry control unit 252 to adjust the radial position of the gamma camera 200 to minimize the distance between the imaging surface (collimator) and the patient. Once this distance is minimized, the gamma camera 200 is able to collect the gamma radiation from the patient to record the organ, tissue or bone of interest using ECT or total body scan techniques. This process is herein called ECT of total body scanning. This image information is also fed to computer processing system 210 for processing, display and storage purposes. It is appreciated that while the gamma camera 200 is performing a total body scan operation, the proximity detectors 100, 110 are able to input new profile data on a new cross-section of patient 59. When the gantry structure moves down track 250 for a new total body scan section, this new profile data will then be used to adjust the radial position of camera 200.

FIG. 4 illustrates a breadboard diagrammatic design of one of the proximity detector units 100 of the present invention. The dimensions of the proximity detector unit are approximately 4 inches wide and 3 inches high. The other proximity detector 110 is essentially a duplicate of proximity detector 100. Proximity detector unit 100 contains an energy emission device 57 which is projected onto a sweeper 79 which performs the sweeping function to create sweep beam 80. The energy emission device 57 is an infrared laser beam in the preferred embodiment of the present invention, but an LED device or alternative light source capable of being detected could equally be implemented. The infrared laser beam selected is approximately 2 mW and is collimated at 1 mm diameter. A laser beam is selected for the preferred embodiment of the present invention, over an LED, because the laser beam offers a narrower beam diameter and thus provides greater resolution for the proximity detection system. For example, an LED emission device has a beam diameter of 2 cm and requires more collimating. The infrared laser beam of the present invention is modulated, by a modulator also located at 57, to a preselected frequency and then directed to a sweeper 79. The sweeper is a specialized mirror mounted on a motor and designed to sweep an arc to cover the field of view 150 of the left or right side of the patient depending on which proximity detector unit is described. FIG. 4 also illustrates the sweeper 79 illuminating one point 58 of target 59 with a sweeping beam 80.

Proximity detector unit 100 of the present invention also contains two lens devices 50 and 51 (each approximately 20 mm in diameter) for receiving reflected beam energy from the object 59 and focusing that energy onto two separate energy detectors 54 and 55 respectively. Each energy detector is a linear array of PSDs (position sensitive diodes) which each generate analog signals indicative of the position of the light on the array and intensity level of energy illuminated by the reflected and focused energy beam. Each lens device 50 and 51 separately focuses reflective beam energy onto separate energy detectors 54 and 55. The energy detectors 54, 55 are coupled to a preamplifier then to an A/D converter and scan controller unit 102. This hardware scan controller unit 102 initially gathers the input analog signal from the energy detectors 54, 55 and demodulates the signal as well as performs other weighting factors and normalization procedures to the input analog signals from the energy detectors 54, 55. Hardware seam control unit 102 also performs an analog to digital signal conversion of the energy detector signal. Unit 102 also drives the sweeper 79 by controlling the beam sweep rate and individual sweep frequencies as well as controls the position of sweeper 79. Microcontroller 104 is a general purpose control device for the proximity detector 100 and controls the communication and timing of events between individual devices of the proximity detector unit 100. microcontroller 104 also controls communication between the proximity detector 100 and the computer processing system 210 which is coupled to both proximity detector units 100, 110 via each Microntroller 104 of each proximity detector unit. Block 105 is the power supply for the proximity detector unit 100. Microntroller 104 receives instructions from the computer processing system 210 to indicate when to begin a profile collection and when to transfer data from a profile collection. Microntroller 104 also receives information indicating the sweep rate of sweeper 79.

As illustrated in FIG. 4, sweeper 79 of the present invention is shown in a sweep location directing sweep beam 80 at object 59 on point 58. Two reflection beams 84 and 82 represent the reflected energy collected and focused by lens devices 51 and 50 respectively. The lens devices 51, 50 are aligned with respect to the associated energy detector 55, 54 in order to form a center of radiated energy intensity onto each of the energy detector linear arrays depending on the location of the target point 58. This center of energy intensity, often called a center of mass, is represented by analog outputs which are fed to a preamplifier and then to hardware scan controller unit 102 where the signals are converted to digital data and fed to computer processing unit 210 (via communication and microcontroller 104) where the position of point 58 located on body surface 59 can be determined by spatial calculations of the relative positions of the two centers of energy within the linear arrays. The proximity detector units 100, 110 are placed within an exterior housing for mounting and alignment on the circular portion of the gantry structure 205. In the preferred embodiment of the present invention the actual housing is somewhat U-shaped and contains both proximity detector units 110 and 100.

FIG. 5 illustrates a detailed diagram of the proximity detection system of the preferred embodiment of the present invention. The spacing between the centers 71, 72 of the linear arrays 55, 54 of energy detectors is indicated by reference 60 and is referred to as the value S. The value S is predetermined and known. The distance 75 between each lens device 51, 50 and the associated energy detector is the value L, another known value which is the focal length of the imaging optics. The following discussion centers around a procedure for determining a single point 58 of a profile section of an object 59 during a sweep of sweep beam 80. It should be appreciated that the profile measurement method of the present invention sweeps across the field of view 150 of each detector and performs up to 200 different single point calculations per sweep for a given profile while many profiles are utilized to create a body contour. For simplicity and clarity, proximity detection of one single point of a particular profile is selected for discussion herein.

The infrared laser (an energy emission device) 57 of the present invention emits a modulated laser beam onto sweeper 79 which sweeps and directs the sweep beam 80 onto a particular point 58 at a given moment within a sweep cycle. Sweeper 79 is a mirror, shown in FIG. 5 in a stationary position in mid sweep of a sweep cycle. Reflective electromagnetic energy 82, 84 from target point 58 is gathered by lens devices 50 and 51 and focused onto portions of linear arrays 54 and 55 respectively. The linear arrays are position sensitive diodes or PSDs which indicate the position of illuminating energy and the intensity of that energy at that given position. Next, a center of mass calculation is performed based on the intensity of illuminated electromagnetic energy over a region of the PSDs and also based on the total amount of illuminated light intensity over the linear array. The center of energy intensity ("mass") calculation for the illuminated energy is a standard center of mass calculation taking the form of:

$$x = \frac{\sum_{i=0 \text{ to } n} (\text{Intensity}_i \times \text{Position}_i)}{\sum_{i=0 \text{ to } n} (\text{Intensity}_i)} \quad (1)$$

Where x is the spatial center of mass (intensity) of a particular linear array referenced from the center point of that array; Intensity is the light intensity value of a particular point (i) of the linear array; and Position$_i$ is the position of a particular point (i) of the linear array referenced from the center point. The sum calculations are performed across all points (0 to n) of the linear array. The result indicates a position along the linear array which receives the center of the focused light intensity, "mass" from the associated lens device. This corresponds to the location of the target point 58 reflecting the light energy. According to FIG. 5, reference 64 indicates the center of intensity, x1, for energy detector 55 while reference 62 indicates the center of intensity, x2, for energy detector 54. The values of x1 and x2 being calculated based on equation (1) above. Knowing the length between the energy detectors, S, the focal length value L, and the two values x1 and x2, the distance D 65 can be calculated with trigonometry. Once D is calculated, the XY position of point 58 can be determined since the XY values of the centers 71, 72 of the linear arrays of energy detectors 54 and 55 are known and the relationship between the center 71, 72 and the point 58 is known. Furthermore, the Z position of point 58 is already known because all the gathered data points for each separate profile exist within the same Z plane.

The value of D is arrived at by the following equations. As shown in FIG. 5, the value Theta1 is the angle between the reflected beam onto linear array detector 55 and the distance S. Theta2 is the angle formed between the reflected beam onto linear array detector 54 and the distance S 60. Theta1 is equal to the equation, $\tan^{-1}(L/x1)$, while theta2 is determined by the equation, $\tan^{-1}(L/x2)$. With reference to the alignment of the imaging optics, a triangle is formed having a base of $[S+x1+x2]$ and a height of D 65. The value of D must therefore equal the trigonometric equation:

$$D = \frac{[(S + x1 + x2) * \sin(\text{theta1}) * \sin(\text{theta2})]}{[\sin(\text{theta1} + \text{theta2})]} \quad (2)$$

The XY coordinate value of point 58 of body surface 59 can then be determined by a function of D, the center 71 of linear array 55 and the center 72 of linear array 54, all of which are known quantities. The above calculation is performed for each point along the linear profile by both proximity detectors 110 and 100.

In operation, to collect an entire profile of data, the present invention sweeps via proximity detector 100 across the right side of the patient 59 determining the target points of the profile along the right side of the profile of patient 59 while proximity detector 110 determines the points making up the left side of the profile of patient 59 with a separate sweep beam 80. Data representing the centers of intensity of each linear array are transformed by the above equations into (X,Y,Z) coordinates of the profile by the computer processing unit 210. When a particular profile is complete, the gantry system moves up or down the cranial-caudal axis of the patient 59 along track 250 to a new location of the body 59 to perform another profile image. The computer processing system 210 records each profile data and creates a body surface contour in three dimensions. The body surface contour will be used to adjust the position of gamma camera detector 200 during scanning operations to minimize the collimator-patient distance as discussed previously.

It is appreciated that the preferred embodiment of the present invention discloses a system that is capable of scanning for profile data as the gantry traverses track 250 (thus creating partial contour data) while at the same time performing total body imaging operations during the same motion (to scan partial sections of the patient 59). During the partial motion across the patient the profile determination system feeds information to the gamma camera gantry control unit 252. Thus, the target patient 59 is partially scanned for profile data while being total body scanned until the entire pertinent section of patient 59 is imaged by the total body scan operation. However, it is also appreciated that the gantry structure of the present invention could also first move completely across the patient 59 along track 250 to obtain a total body contour, then, secondly, adjust to its initial position and then perform the complete total body scanning operation (or ECT scan operation for that matter) after the completion of the profile determination step; in this case the present invention makes two complete passes, one to collect all of the body contour data and a second to perform the total body or ECT imaging operation. It is recognized that either system design is within the spirit and scope of the present invention.

FIG. 6 is an overall structural and operational flow diagram of the essential elements of the preferred embodiment of the present invention. Block 300 is the modulation stage where the energy beam emitted from emission device 57 is modulated, or pulsed at a known frequency. This is done in an effort to reduce noise and stray light received at the energy detectors 54, 55. Demodulator block 340 filters out any deflected energy signals not having the same modulated frequency as initially set. Block 340 thus filters out any ambient light energy from the detection system. Block 355 acts to control the frequency and characteristics of the modulation of the energy beam. Block 305 emits an energy beam, which can be produced by either an infrared laser device, a light emitting diode, or other light emitting source from the energy emission device 57 located within the proximity detector units 100, 110. Block 310 is the collimator unit. When an LED is used as the emission device, it must be collimated to focus the beam. When a laser beam is used as the emission device the collimator is not essential but can aid in focusing the emission beam. Block 315 is the sweeper stage which sweeps the mirror 79 to perform the beam sweeping operation. Sweeper (Scanner) 79 is actuated by sweeper driver 320 to rotate mirror 79 by a rotating motor (spin motor) thus deflecting the energy beam across the left or right side of the patient, depending on the location of the particular proximity detector 110 or 100. Sweeper driver 320 also includes an amplifier to amplify the control signal which originates from block 355. A sweeper and sweeper driver 320 are associated with each proximity detector 100 and 110.

Sweeper driver 320 is coupled to the data acquisition adapter block 355. Block 355 can reside within the computer processing unit 210 or can reside within the detector at unit 102; the location of the hardware unit is not essential to the present invention. In the preferred embodiment of the present invention the processing required for block 355 is performed within the proximity detector unit 100 and 110. Block 355 controls the sweeping operation of block 315, including the timing and frequency of the sweep rate and number of target points within a single sweep. Next, block 325 represents the target 59 and the associated environment of the gamma camera. Block 325 represents the object of which image and proximity data is requested. Sweeper at block 315 sweeps the target 59 located within block 325 with radiant energy to determine a profile. Block 330 represents the detector optics of the proximity detector units 100 and 110. Lens devices 50 and 51, located on each proximity detector unit, act to gather and focus deflected energy from point 58 of the target 59 onto a set of detectors located within block 335. There are two energy detectors 54, 55 and two lens devices 50, 51 associated with each proximity detector unit. Linear arrays associated with each energy detector 54, 55 output an analog signal which is amplified to demodulators 340 which act to electronically filter any energy signal not of the originally modulated frequency. This eliminates stray light and noise signals from the overall system.

Referring still to FIG. 6, the demodulated analog signals from the linear arrays are fed to hardware implemented block 355 which converts the analog signals to digital signals for input into the computer processing system 210. In the preferred embodiment of the present invention, block 355 may reside within the proximity detector units 100, 110. Block 360 is a software implemented process which controls block 355 and accepts the digital data gathered by the profile sweep of both the left and right proximity detector units. This block integrates the data gathered by linear array 54 and 55. Since this linear array signal data has not yet be reduced to coordinate values it is referred to "raw" data or a "raw" image. Next, block 365, implemented in software, processes the linear array data of block 360 to perform the trigonometric calculations to determine D, and the coordinate value (X,Y,Z) for each target point 58 within the current profile. Block 365 records and controls the position of the gantry structure along track 250 in order to associate the correct Z value with the gathered XY values for each point within the profile of data. A gathered set of data points for a particular profile resides within the same XY plane. Block 365 also integrates the left and right profile data (and any lower profile data) from both proximity detectors 110 and 100 to create a 360 degree profile of body 59. Block 365 integrates any profile data from proximity detector units located below the patient in alternative embodiments of the present invention. Block 365 then integrates all of the profiles collected in order to create a three dimensional surface contour of the target body 59. Block 365 stores and allows access to all of the above calculated data. Blocks 360 and 365 are implemented within the computer processing unit 210 of the preferred embodiment of the present invention.

Next, block 370 is implemented in both hardware and software. The software portion retrieves the data stored in block 365 in order to display the proximity data if desired. The hardware portion of block 370 represents the display unit 216 of the computer processing unit 210 which can display on a computer screen the profile or contour data of the body 59. Block 380 is the executive or software control block which directs and regulates the activities and scheduling of events and data processing of blocks 355, 360, 365, 370, and 375. Block 380 is implemented in software and resides in the computer processing unit 210. Block 375 is a communication interface block which allows communication between the proximity detection system of the present invention as described above and other systems of the computer processing unit 210 of the gamma camera system.

Referring still to FIG. 6, communication interface block 375 is coupled to gantry control block 350. Block 350 reads the body contour data stored within block 365 in order to control the gantry control unit 252 which adjusts the radial position of the gamma camera detector 200. The body contour data collected by proximity detectors 110 and 100 is stored with reference to a Z-position along track 250 which is the cranial-caudal axis of patient 59. As the camera detector 200 positions itself over a new scan position of patient 59 (a new Z-position), block 350 collects the body contour data associated with this new Z-position from block 365. Gantry control block 350 then calculates an XY radial position for gamma camera detector 200 which minimizes the distance between the collimator and the surface of patient 59, determined by the contour data, associated with the new Z-position. Gantry control block 350 then controls the gantry control unit 252 to adjust the gamma camera detector 200 to the newly calculated position which minimizes the collimator-patient distance. Then ECT or total body scanning operations may begin as the gamma camera scans the new body section. While the gamma camera is scanning this new section during a total body scan, the proximity detectors 100, 110 may collect new profile data for the next scan section along track 250. When gantry 205 moves down track 250 to the new Z position, proximity detectors 110 and 100 move to a new profile section as well as the scanning camera detector 200 to collect new data.

It is appreciated that block 350 also controls the position of the gantry structure 205. Block 350 controls the movement of the gantry structure 205 across track 250. Therefore, when the ECT or total body scanning for a particular position along the cranial-caudal axis is complete, or when a profile of data is collected, block 350 moves the gantry structure 205 along the track 250 to a new Z position. Block 350 is controlled by the executive software block 380. As discussed, by moving the gamma camera 200 along track 250 successive profiles can be determined to create a three dimensional body contour image.

FIG. 7 illustrates a computer flow diagram of processing sections performed within the computer processing system 210 of the present invention. At block 400 an area of the patient 59 is selected for ECT or total body scan and input into the scanning system. At block 410 processing is accomplished whereby the gantry structure 205 is pulled back to an initialized position along track 250 to the start of the scan location of the area of patient 59 which was selected in block 400. At block 420, computer processing system 210 directs a profile sweep of the patient 59 by proximity detectors 100, 110 and this proximity data information is fed to block 430 where the profile data is computed and the body contour data is generated from the profile data yet collected. At block 440 the computer system 210 updates the Z-axis position (a new Z-axis position) of the gantry structure 205 along track 250 to the next ECT or total body scan segment. At block 450 the body contour data is accessed to retrieve the gathered profile data associated with the new Z-axis position and the computer system 210 issues a command which adjusts the radial position of the camera detector 200 via control from the gantry control unit 252 in order to minimize the distance between the imaging surface of the camera detector 200 and the portion of the patient 59 associated with the new Z-axis location.

At block 460 of FIG. 7 the next ECT or total body scan is then performed at the new Z-axis position and the image data is collected by computer system 210 for processing. Next, block 470 checks if all scanning operation is complete by checking if the end of the selected patient segment was reached. If not, a new profile data segment is gathered at block 420 and the system cycles through again to block 470. It should be appreciated that for any given Z-position of the gantry structure it is possible to execute blocks 420 and 460 at the same time for increased efficiency. These blocks are shown in FIG. 7 as separate processes only to clarify the individual process steps of the present invention.

ECT Movement of the Anger Camera

As discussed above, the gamma camera 200 is capable of radial movement as well as circular or ECT movement about the patient 59. When the gamma camera 200 goes through ECT motion at a stationary Z position, the profile data collected from the detectors 100, 110 can still be used to radially adjust the gamma camera 200 to minimize the distance between the collimator and the patient. The profile data, and contour data, collected by the proximity detection system of the present invention are collected in terms of the actual XYZ positions of the height of the patient 59 and are not collected with reference to any particular ECT position or radial position of the gamma camera 200. Therefore, according to the design of the present invention, profile data does not have to be re-collected and analyzed each time the gamma camera changes its ECT or radial position.

For each new ECT or total body position of the gamma camera 200, the height or body profile of the patient 59 will require that the radial position of the gamma camera 200 be adjusted to a new location in order to maintain the minimum distance between the collimator of the camera and the patient height. When the camera 200 moves in an ECT direction or translates to a new total body position, the computer processing system 210 accesses the body contour data stored within block 365. This proximity data is analyzed to determine the maximum height of the patient 59 profile in a direction orthogonal to the imaging surface 11 of the camera 200 in its new ECT or total body position. Then a new radial position of the gamma camera 200 is computed to minimize the distance between the profile height and the camera imaging surface 11. Gantry control 350 then adjusts the gantry control unit 252 so that the gamma camera 200 arrives at this new radial position; then ECT scanning can begin. This procedure is repeated each time the gamma camera 200 moves through a new ECT or total body position. It should be appreciated that the present invention allows for automatic radial adjustment for each new ECT or total body position, therefore, a technician operating the ECT or total body system of the present invention is not required to manually make such an adjustment. It is appreciated that the above is also applicable for the total body scan technique.

Data Averaging

The preferred embodiment of the present invention advantageously performs both spatial averaging of data points as well as temporal averaging of data points to reduce noise, distortion and error within the profile detection system. In the preferred embodiment of the present invention, these averaging calculations occur in block 365. The present invention spatially averages data points by averaging the position of a currently detected data point 58 with the positions of other data points within a same profile which surround the current point 58 to determine the coordinate position of point 58. This is called spatial profile averaging. The present invention also spatially averages data points by averaging the position of a currently detected data point 58 with the positions of data points from other profiles within the body contour that are adjacent to the point 58 to arrive at the coordinate position of point 58. This is called spatial contour averaging. If point 58 should be read in error, this error will become averaged out by combining the error point with other properly determined adjacent data points. System error is reduced.

The present invention also performs temporal averaging of data points 58. This is performed by sampling a particular position of data point 58 several times, on the order of 10 samples per data point. The actual coordinate value of the point 58 would then be the average of the 10 detected samples. If one of the 10 samples should be in error, this error would be averaged down by the 9 other properly determined samples. Therefore, system error is reduced. It should be appreciated that the present invention also performs both spatial and temporal averaging of data points in order to reduce data detection error.

Normalization

The present invention also performs a normalization correction on the signals originating from the linear arrays of energy detectors 54 and 55 in order to correct for errors in energy intensity fluctuations. The normalization function may occur at any of blocks 355, 360 or 365 depending on the type of implementation in either hardware or software; both implementations are within the scope and spirit of the present invention. The signals from the linear arrays (PSDs) are of a dual signal format, also called a differential mode detector format. The present invention reads the input from these energy detectors by taking the difference between the signals and dividing by the total reflective electromagnetic energy which illuminates the energy detector. Therefore, the intensity of a particular point along the linear array is normalized according to the total energy detected by the linear array. By normalizing the signal of the linear arrays, the present invention is able to increase the dynamic range of the response of the linear array detectors. Also, the linear arrays are not as susceptible to light intensity changes when the signal is normalized. Noise and error is thus reduced according to the present invention by normalizing the differential mode output of the linear array detectors.

Lens Filter

The preferred embodiment of the present invention utilizes an optical filter coupled to the lens devices 50, 51 to filter out stray beam energy from the proximity detector units 100, 110. The optical filter is adjusted to the frequency of the energy emitted from emitter 57 and therefore adjusted to the infrared frequency of the reflected beams 84 and 82. Other stray energy not of the same frequency as the reflective beams will not pass through the lens devices 50, 51 to the linear array detectors 54, 55. In using this filter, the present invention further reduces proximity sampling errors.

Partial Profile and Contour Data

Since the present invention directly measures the height of the surface of patient 59, a partial profile can be determined without the necessity to sweep the entire patient's surface. For instance, if the tissue, bone or organ of interest is located on the left side of patient 59, then a scan of the right side of patient 59 is not required. The present invention is capable of sweeping only on the left side, or only a partial section of the left side, if desired. Partial profile determination is advantageous because processing time of the computer processing unit 210 is not wasted performing calculations to create an entire profile when only a portion of the profile is desired. By adjusting the field of view 150 (FIG. 3) of proximity detector units 100, 110 a partial profile image of patient 59 can be processed. By directing only the left or fight proximity detector unit to sweep a partial right or a partial left profile can be determined. By combining successive partial profiles a partial body contour can be generated. The present invention advantageously allows partial profiles to be determined by the proximity detection system of the preferred embodiment.

Single Detector Unit Operation

The preferred embodiment of the present invention utilizes two proximity detector units 100, 110 located on the left and right hand side of the gantry structure 205. Two proximity detector units are used in order to increase the field of view for the detector sweeps across patient 59. The imaging optics operate with more resolution and coverage using two detectors so located. As discussed, embodiments of the present invention also utilize additional proximity detectors oriented below the patient. However, one embodiment of the present invention operates with only one proximity detector unit which is located in the top center of gantry structure 205. In this case, the field of view for the centrally located proximity detector unit is much wider than 90 degrees. In systems which do not require high profile resolution, a single centrally located proximity detector unit is advantageous because such a design reduces the complexity and expense of the overall camera system.

Another embodiment of the present invention utilizes only one proximity detector unit, but changes the position of the proximity detector unit from a left position to a right position along the circular portion of gantry structure 205. The single proximity detector embodiment also may change position around the gantry to orient the proximity detector underneath the patient for a posterior profile scan. For example, the proximity detector unit of this embodiment first performs a left sweep of the profile located on the left side of the patient 59 then moves along a track located on gantry 205 to reposition itself on the right side of the patient 59 to perform a right sweep of the profile. Then the proximity detector may move to a position underneath the object. In so doing, this embodiment of the present invention detects a patient profile with the same resolution as the preferred embodiment of the present invention but with only one proximity detector unit and a gantry track to relocate the single detector.

High Resolution Profile

The resolution of a profile detected by the present invention is limited by the elements of the linear array detectors 54, 55 which are very small position sensitive diodes. Because PSDs are utilized in the present invention, rather than an array of large emitters and detectors (as in the prior art), the resolution of a profile of data collected by the present invention is very high. Resolution on the order of millimeters is achieved using PSDs. Each detector is capable of determining many points (roughly 75–200) along either the left or right profile section. High resolution profile data is advantageous because the distance between the collimator of gamma camera 200 and the patient 59 can be more accurately minimized with higher resolution profile data. This directly leads to better quality images from the ECT or total body scanning operations of the camera.

Attenuation Correction and Body Contour Database

The present invention also offers the ability to increase image quality of the camera system by generating an average attenuation correction factor which is applied to increase the number of detected photon events from the imaging surface in order to correct for attenuation of gamma rays. As will be discussed below, the correction factor is generated, in part, from the body contour database. Gamma radiation traveling through a body (i.e., a patient) from an emission source (i.e., an organ of interest bearing a radiopharmaceutical) experiences attenuation as the rays travel through the body tissue, this attenuation is exponential with regard to the thickness of the body measured between the source and the imaging surface of the camera detector. The attenuation causes the number of photon events detected by the imaging surface to be less than what would otherwise be detected without the attenuation. The attenuation can be expressed as, $I = I_O e^{-ux}$, where u is a standard, noncritical, constant (from 0.08 to 0.15 per cm) constant and x is the thickness of the body traveled by the gamma radiation to the imaging surface. Also, $I_O$ is the amount of gamma radiation generated by the source and I is the amount of gamma radiation actually detected by the imaging surface. As can be seen, this attenuation decreases the number of gamma ray events that are detected by the imaging surface as a function of the thickness of the body for a given ECT rotation angle of the imaging surface (because each angle of rotation has an associated thickness depending on the orientation of the body and the source).

During SPECT studies, the spatial location of the radiation source with respect to the body is determined by well known techniques of reconstruction. As discussed above, the present invention advantageously generates a three dimensional contour database of the body. The present invention, via processing of the computer processing unit 210, then combines the three dimensional body contour database with the reconstructed location of the source in order to provide a database which contains the source location and a body contour location in three dimensions. Using this database, the computer processing unit 210 is able to calculate thickness values of the body for a given ECT angle of rotation of the imaging surface (i.e., the thickness of the body between a line from the source and the imaging surface). Given this thickness value, x, for each angle of rotation an attenuation correction factor can be computed by the equation $e^{-ux}$ for each rotation angle. The attenuation correction factors for each ECT rotation angle are then averaged to arrive at one, average attenuation correction factor. This average attenuation correction factor ("constant") is then used to increase the amount of scintillations that were initially detected by the imaging surface electronics at all ECT rotation angles. Applying the above, the present invention determines the number of photons detected and increases this number by the constant computed above.

For instance, given a spherical body and a source located on the top or upper portion of the body (90 degrees for top) an ECT imaging surface would rotate and gather image data of a slice of that sphere at 0 degrees, 90 degrees, 180 degrees and 270 degrees (angles of rotation). When the scanning image is at 90 degrees the body thickness between the imaging surface and source is the smallest. At 270 degrees rotation angle of the imaging surface the body thickness between the source and the imaging surface is the largest. At 180 degrees and at 0 degrees rotation angle, the body thickness is equivalent and at a value in between the above two thickness. The present invention utilizes the body contour database to construct an outline of the spherical body as discussed above utilizing the proximity detectors and related electronics and processing. The present invention then reads the location of the source in relation to the spherical body by a reconstruction of the ECT scan data. The present invention combines these database values to compute a body thickness for each rotation angle, 0, 90, 180, and 270 degrees. For each rotation angle, the present invention computes an attenuation correction factor based on the thickness (between the source and the imaging surface) of the body at that rotation angles using the exponential equation above. All of these computed attenuation factors are then averaged into one average attenuation factor. This average attenuation factor is used to increase the relative amount of scintillations detected by the imaging surface at each rotation angle during an ECT scan operation. By correcting for gamma radiation attenuation, the overall image quality of the organ (source) is increased by the present invention. Without the advantageous body contour database generated by the present invention, such a correction factor may not be available or practical to generate.

By doing the above procedure, the present invention is able to increase image quality by anticipating and adjusting for the attenuation of gamma radiation caused by varying body thickness during a scan operation.

The preferred embodiment of the present invention, a direct measurement proximity detector system capable of creating a three dimensional body contour composed of successive body profiles, is thus described. While the present invention has been described in one particular embodiment, it should be appreciated that the present invention should not be construed as limited by such embodiment, but rather construed according to the below claims.

What is claimed is:

1. In a medical imaging system having an imaging surface of a scintillation detector, a gentry structure, a gentry control unit coupled a scanning camera for movement of said imaging surface relative to an object, and an apparatus for profile determination of said object, said apparatus comprising:

means for generating triangulation data, wherein said means for generating triangulation data further comprises;

means for illuminating said object by emitting an electromagnetic energy beam;

sweeping means optically coupled to receive and reflect said electromagnetic energy beam, said sweeping means for sweeping said electromagnetic energy beam across a plurality of discrete points of said object;

focusing means for focusing electromagnetic energy reflected frown said plurality of points of said object onto an electromagnetic energy detector means;

said electromagnetic energy detector means for detecting position and intensity information of electromagnetic energy received from said focusing means and based thereon for generating said triangulation data; and a filter for preventing energy not of a same wavelength as said electromagnetic energy beam from entering said electromagnetic energy detector means; and proximity calculation means for directly computing spatial locations of said plurality of points of said object based on said triangulation data for each of said plurality of points of said object illuminated by said electromagnetic energy beam by taking an average location of a plurality of location samples of each point of said plurality of points, said proximity calculation means coupled to receive said triangulation data from said means for generating triangulation data.

2. An apparatus for profile determination of an object as described in claim 1 wherein said proximity calculation means computes said locations of said plurality of points of said object by determining angles of incidence of said reflected electromagnetic energy with respect to said electromagnetic energy detector means.

3. An apparatus for profile determination of an object as described in claim 1 further comprising:
 computer processing means coupled to said proximity calculation means, said computer processing means for storing said locations of said plurality of points of said object to create a surface profile database of said object, wherein said computer processing means further comprises;
 means for computing attenuation correction factors based on a determined location of a radiation source within said object and said surface profile database of said object; and
 means for increasing image quality of said object by increasing a number of detected scintillations of said imaging surface based on said attenuation correction factors.

4. An apparatus for profile determination of an object as described in claim 1 further comprising:
 computer processing means coupled to said proximity calculation means, said computer processing means for storing said locations of said plurality of points of said object to create a surface profile database for said object; and
 gantry control means communicatively coupled to said computer processing means and coupled to said gantry control unit for analyzing said surface profile database and based thereon for controlling said gantry control unit to adjust a position of said imaging surface to minimize a distance between said imaging surface and said object.

5. An apparatus for profile determination of an object as described in claim 4 wherein said proximity calculation means is located on said gantry structure which is stationary with respect to movement of said imaging surface.

6. An apparatus for profile determination of an object as described in claim 4 wherein relative movement exists between said gantry structure and said object and wherein said proximity calculation means computes said locations of said plurality of points of said object for positions of said gantry structure along a cranial caudal axis of said object.

7. An apparatus for profile determination of an object as described in claim 6 further comprising scanning means coupled to said scanning camera for scanning an image of said object based on radiated gamma rays, said scanning means for scanning an image for each of said positions of said gantry structure along said cranial-caudal axis of said object, said scanning means coupled to said computer processing means.

8. An apparatus for profile determination of an object as described in claim 7 wherein said proximity calculation means computes said locations of said plurality of points of said object at a position of said gantry structure along said cranial-caudal axis of said object while said scanning means simultaneously scans an image of said object at another position of said gantry structure along said cranial-caudal axis of said object.

9. An apparatus for profile determination of an object as described in claim 6 wherein said computer processing means generates a body contour database from said surface profile database, said body contour database comprising successive profiles of said surface profile database, each of said successive profiles associated with each of said positions of said gantry structure along said cranial-caudal axis of said object.

10. In a medical imaging system having at least one imaging surface of a scintillation detector a gantry structure, a gantry control unit coupled to said imaging surface for movement of said imaging surface, an axial track coupled to said gantry structure, and an apparatus for profile determination of an object, said apparatus comprising:
 an electromagnetic energy emission device generating a modulated electromagnetic energy beam;
 a sweeping device optically coupled to receive said modulated electromagnetic energy beam, said sweeping device sweeping said modulated electromagnetic energy beam across a plurality of points of said object;
 an electromagnetic energy detector device detecting intensity and position of reflected electromagnetic beam energy;
 a focusing device focusing said reflected electromagnetic beam energy from said plurality of points of said object onto said electromagnetic energy detector device;
 a demodulation device demodulating said reflected electromagnetic beam energy; and
 a proximity calculation device directly computing locations of each of said plurality of points of said object based on said reflected electromagnetic beam energy, said proximity calculation device coupled to said demodulation device, said proximity calculation device computing said locations of said plurality of said object by determining angles of incidence of said reflected electromagnetic beam energy with respect to said electromagnetic energy detector device.

11. An apparatus for profile determination of an object as described in claim 10 further comprising:
 computer processing means for storing said proximity calculation means, said computer processing means for storing said locations of said plurality of points of said object to create a surface profile database of said object, wherein said computer processing means further comprises;
 means for computing attenuation correction factors based on a determined location of a radiation source within said object and said surface profile database of said object; and
 means for increasing image quality of said object by increasing a number of detected scintillations of said imaging surface based on said attenuation correction factors.

12. An apparatus for profile determination of an object as described in claim 10 wherein said electromagnetic energy detector device comprises two position sensitive detectors and wherein said angles of incidence of said reflected electromagnetic beam energy are each determined based on a location of a center of electromagnetic beam intensity reflected on each of said two position sensitive detectors; and further comprising a filter for preventing energy not of a same wavelength as said modulated electromagnetic energy beam from entering said electromagnetic energy detector device.

13. An apparatus for profile determination of an object as described in claim 12 further comprising:

computer processing means coupled to said proximity calculation device, said computer processing means storing said locations of said plurality of points of said object to create a surface profile database of said object; and gantry control device communicatively coupled to said computer processing means and coupled to said gantry control unit for analyzing said surface profile database and based thereon for controlling said gantry control unit to adjust a position of said imaging surface to minimize a distance between said imaging surface and said object.

14. An apparatus for profile determination of an object as described in claim 12 wherein each of said two position sensitive detectors has a dual mode output signal which is normalized based on a total intensity of said electromagnetic beam intensity reflected onto each position sensitive detectors.

15. An apparatus for profile determination of an object as described in claim 12 wherein said focusing device comprise two optic lens devices, each optic lens device optically coupled with an individual position sensitive detector to focus said reflected electromagnetic beam intensity onto said individual position sensitive detector.

16. An apparatus for profile determination of an object as described in claim 12 wherein said sweeping device comprises a mirror deflecting said electromagnetic energy beam and a rotation motor coupled to said mirror for rotating said mirror.

17. An apparatus for profile determination of an object as described in claim 12 wherein said electromagnetic energy emission device is an infrared laser and said modulated electromagnetic energy beam is a modulated infrared laser energy beam.

18. An apparatus for profile determination of an object as described in claim 12 wherein said sweeping device sweeps said modulated electromagnetic energy beam across said plurality of points of said object in a plane traverse to a cranial caudal axis of said object.

19. An apparatus for profile determination of an object as described in claim 12 wherein said sweeping device as well as said electromagnetic energy detector device are located on said gantry structure which is stationary with respect to said movement of said imaging surface.

20. An apparatus for profile determination of an object as described in claim 19 wherein said gantry structure is movable along said axial track which runs along a cranial-caudal axis of said object and wherein said proximity calculation device computes said locations of said plurality of points of said object for each position of said gantry structure along said axial track.

21. An apparatus for profile determination of an object as described in claim 20 further comprising a scanning device scanning an image of said object based on emitted energy, said scanning device scanning an image for each position of said gantry structure along said axial track, said scanning device coupled to said imaging surface.

22. An apparatus for profile determination of an object as described in claim 21 further comprising a computer processing means coupled to said proximity calculation device, said computer processing means for storing said locations of said plurality of points of said object to create a surface profile database of said object and wherein said computer processing means is also for generating a body contour database from said surface profile database said body contour database comprising successive profiles of said surface profile database, each of said successive profiles associated with each position of said gantry structure along said axial track.

23. An apparatus for profile determination of an object as described in claim 22 wherein said proximity calculation device computes said locations of said plurality of points of said object at a position of said gantry structure along said cranial-caudal axis of said object while said scanning device simultaneously scans an image of said object at another position of said gantry structure along said cranial axis of said object.

24. An apparatus for improving image quality in a medical imaging system having at least one imaging surface of a scintillation detector, a gantry structure, a gantry control unit coupled to said imaging surface to precisely displace said imaging surface relative to an object and an axial track coupled to said gantry structure, said apparatus comprising:

a plurality of profile detector means for determining successive profiles of said object, each of said successive profiles associated with a particular position of said gentry structure along said axial track, said plurality of profile detector means coupled to said gentry structure so that said plurality of profile detector means are stationary with respect to said gentry structure, each of said plurality of profile detector means further comprising:

an electromagnetic emission means for generating a modulated electromagnetic energy beam;

sweeping means for sweeping said modulated electromagnetic energy beam across plurality of points of said object in a plane across a cranial-caudal axis of said object;

a plurality of position sensitive detectors for detecting position and intensity of reflected electromagnetic energy;

a plurality of focusing means, each of said plurality of focusing means having an associated position sensitive detector of said plurality of position sensitive detectors, said plurality of focusing means for focusing said reflected electromagnetic energy from said plurality of points of said object onto said plurality of position sensitive detectors;

a demodulation means for demodulating said reflected electromagnetic energy;

location calculation means for directly calculating spatial location of each of said plurality of points of said object by measuring an angle of incidence of said reflected electromagnetic energy from each of said plurality of points of said object with respect to a position sensitive detector, said location calculation means coupled to said demodulation means; and filter means for preventing energy not of a same wavelength as said modulated electromagnetic energy beam from entering said plurality of position sensitive detectors.

25. An apparatus for improving image quality in a nuclear medicine camera system as described in claim 24 further comprising:

computer processing means coupled to said plurality of profile detector means, said computer processing means for storing said locations of said plurality of points of said object to create a body contour database of said object by combining said successive profiles; and gantry control means communicatively coupled to said computer processing means and coupled to said gantry control unit, said gantry control means for analyzing said body contour database and based thereon for controlling said gantry control unit to adjust a position of said imaging surface to minimize a distance between said imaging surface and said object.

26. An apparatus for improving image quality in a nuclear medicine camera system as described in claim 25 wherein said sweeping means comprises a mirror means for deflecting said modulated electromagnetic energy beam and a rotation motor coupled to said mirror means for rotating said mirror means.

27. An apparatus for improving image quality in a nuclear medicine camera system as described in claim 25 wherein said electromagnetic emission means is an infrared laser and said modulated electromagnetic energy beam is a modulated infrared laser energy beam.

28. An apparatus for improving image quality in a nuclear medicine camera system as described in claim 25 wherein said location calculation means directly calculates said locations of each of said plurality of points of said object by taking an average location of a plurality of measuring location samples of each of said plurality of points of said object.

29. An apparatus for improving image quality in a nuclear medicine camera system as described in claim, 25 wherein said plurality of position sensitive detectors comprises position sensitive diode linear arrays and wherein said angle of incidence of said reflected electromagnetic energy from each of said plurality of points of said object is determined based on a location of a center of electromagnetic beam intensity reflected onto said position sensitive diode linear arrays.

30. An apparatus for improving image quality in a nuclear medicine camera system as described in claim 29 wherein each of said position sensitive diode linear arrays has a dual mode output signal which is normalized based on a total detected energy of an individual position sensitive diode linear array.

31. An apparatus for improving image quality in a nuclear medicine camera system as described in claim 29 wherein said plurality of focusing means comprise optic lens devices, each of said optic lens devices optically coupled with an individual position sensitive diode linear array to focus said reflected electromagnetic energy on said individual position sensitive diode linear array.

32. An apparatus for improving image quality in a nuclear medicine camera system as described in claim 25 wherein said plurality of profile detector means comprise two or three profile detector means, one of said profile detector means for generating successive profiles for a left side of said object and another of said profile detector means for generating successive profiles for a right side of said object.

33. An apparatus for improving image quality in a nuclear medicine camera system as described in claim 32 wherein said gantry structure is moveable along said axial track which runs along a cranial-caudal axis of said object and wherein said plurality of profile detector means computes said locations of said plurality of points of said object for each position of said gantry structure along said axial track.

34. An apparatus for improving image quality in a nuclear medicine camera system as described in claim 33 further comprising scanning means coupled to said imaging surface for scanning an image of said object based on emitted gamma rays, said scanning means for scanning an image for each position of said gantry structure along said axial track, said scanning means coupled to said computer processing means.

35. An apparatus for improving image quality in a nuclear medicine camera system as described in claim 34 wherein said plurality of profile detector means generates a successive profile of said successive profiles of said object at one position along said axial track while said scanning means simultaneously scans an image of said object at a different position along said axial track.

36. A medical imaging system for improved image quality comprising:
a) system means comprising an imaging surface, a gantry structure, a gantry control unit coupled to said gantry structure and coupled to said imaging surface for radial movement of said imaging surface and an axial track for moving said gantry structure along a cranial-caudal axis of said object;
b) a plurality of proximity detector means coupled to said gantry structure for determining successive profiles of said object, each profile of said successive profiles determined at a position of said gantry structure along said cranial-caudal axis of said object, each of said plurality of proximity detector means further comprising:
  1) electromagnetic energy emission means for generating a modulated elecromagnetic energy beam;
  2) sweeping means optically coupled to receive said modulated electromagnetic energy beam, said sweeping means for sweeping said modulated electromagnetic energy beam across a plurality of points of said object in a plane perpendicular to a cranial-caudal axis of said object;
  3) electromagnetic energy detector means for detecting intensity and position of reflected electromagnetic beam energy;
  4) focusing means for focusing said reflected electromagnetic beam energy reflected from said plurality of points of said object onto said electromagnetic energy detector means;
  5) a demodulation means for demodulating said reflected electromagnetic beam energy; and
  6) proxiity calculation means, coupled to said demodulation means, for directly computing locations of each of said plurality of points of said object based on said reflected electromagnetic beams energy from each of said plurality of points of said object, said proximity calculation means for computing said locations of said plurality of points of said object by computing angels of incidence of said reflected electromagnetic beam energy with respect to said electromagnetic energy detector means, wherein said proximity determination means directly computes said locations of each of said plurality of points of said object by taking an average location of a plurality of measuring location samples of each of said plurality of points of said object; and
b) computer processing means coupled to said plurality of proximity detector means, said computer processing means for storing and integrating said successive profiles of said object to create a body contour database of said object.

37. A medical imaging system for improved image quality as described in claim 36 further comprising:
gantry control means communicatively coupled to said computer processing means and coupled to said gantry control unit for analyzing said body contour database and based thereon for controlling said gantry control unit to adjust a position of said imaging surface to minimize a distance between said imaging surface and said object.

38. A medical imaging system for improved image quality as described in claim 37 wherein said sweeping means comprises a mirror means for deflecting said modulated electromagnetic energy beam and a rotation motor coupled to said mirror means for rotating said mirror means.

39. A medical imaging system for improved image quality as described in claim 37 wherein said electromagnetic energy emission means is an infrared laser and said modulated electromagnetic energy beam is a modulated infrared laser energy beam.

40. A medical imaging system for improved image quality as described in claim 37 wherein said electromagnetic energy detector means comprises two position sensitive detectors and wherein said angles of incidence are each determined based on a location of a center of electromagnetic beam intensity reflected on each of said two position sensitive detectors.

41. A medical imaging system for improved image quality as described in claim 40 wherein each of said two position sensitive detectors has a dual mode output signal which is normalized.

42. A medical imaging system for improved image quality as described in claim 40 wherein said focusing means comprises two optic lens devices, each of said two optic lens devices optically coupled with an individual position sensitive detector to focus said electromagnetic beam intensity on said individual position sensitive detector.

43. A medical imaging system for improved image quality as described in claim 37 wherein said plurality of proximity detector means comprises two proximity detector means positioned about and coupled onto said gantry structure so that said two proximity detector means are stationary with respect to said gantry structure, one of said two proximity detector means for determining successive profiles of a left side of said object and an other of said two proximity detector means for determining successive profiles of a right side of said object.

44. A medical imaging system for improved image quality as described in claim 43 wherein said gentry structure is movable along said axial track which runs along said cranial-caudal axis of said object and wherein said plurality of proximity detector means computes said locations of said plurality of points of said object for each position of said gentry structure along said axial track.

45. A medical imaging system for improved image quality as described in claim 44 further comprising scanning means for scanning an image of said object based on emitted gamma rays from said object, said scanning means for scanning an image for each position of said gantry structure along said cranial-caudal axis of said object, said scanning means coupled to said imaging surface and coupled to said computer processing means.

46. A medical imaging system for improved image quality as described in claim 45 wherein said plurality of proximity detector means generates a profile of said successive profiles of said object at one position along said cranial-caudal axis while said scanning means simultaneously scans an image of said object at another position along said cranial-caudal axis.

47. In a medical imaging system having an imaging surface of a scintillation detector a gentry structure, a gentry control unit coupled to said imaging surface for movement of said imaging surface toward an object and an axial track coupled to said gantry structure, a method for profile determination of said object to improve image quality, said method comprising the steps of:
generating a modulated electromagnetic energy beam;
sweeping said modulated electromagnetic energy beam across a plurality of points of said object in a plane across a cranial-caudal axis of said object;
focusing electromagnetic beam energy reflected from said plurality of points of said object;
detecting intensity and position of said focused reflected electromagnetic beam energy with a detector means;
demodulating said reflected electromagnetic beam energy:
filtering electromagnetic energy not of a same wavelength as said reflected electromagnetic beam energy out of said step of detecting;
directly computing locations of each of said plurality of points of said object based on angles of incidence of said reflected electromagnetic beam energy reflected from said plurality of points of said object with respect to said detector means;
using said locations of said plurality of points to minimize a distance between said object and imaging surface; and
scanning said object with said scintillation detector to generate an image thereof.

48. A method for profile determination of an object to improve image quality as described in claim 47 further comprising the steps of:
storing and combining said locations of said plurality of points of said object to create a surface profile database of said object;
computing attenuation correction factors based on a determined location of a radiation source within said object and said surface profile database of said object; and
increasing image quality of said object by increasing a number of detected scintillations of said imaging based on said attenuation correction factors.

49. A method for profile determination of an object to improve image quality as described in claim 47 further comprising the steps of:
storing and combining said locations of said plurality of points of said object to create a surface profile database of said object; and
based on said surface profile database, controlling said gantry control unit to adjust the location of said imaging surface to minimize a distance between said imaging surface and said object.

50. A method for profile determination of an object to improve image quality as described in claim 49 wherein said step of sweeping said electromagnetic energy beam across a plurality of points of said object is accomplished by a mirror means for deflecting said modulated electromagnetic energy beam and a rotation motor coupled to said mirror means for rotating said mirror means.

51. A method for profile determination of an object to improve image quality as described in claim 49 wherein said step of generating a modulated electromagnetic energy beam is accomplished by a modulated infrared laser.

52. A method for profile determination of an object to improve image quality as described in claim 49 wherein said step of detecting intensity and position of said reflected electromagnetic beam energy is accomplished by a plurality of position sensitive detectors as said detector means, and wherein each angle of said angles of incidence of said reflected electromagnetic beam energy reflected from said plurality of points of said object is determined based on a location of a center of electromagnetic beam intensity reflected onto each of said plurality of position sensitive detectors.

53. A method for profile determination of an object to improve image quality as described in claim 52 wherein each of said plurality of position sensitive detectors has a dual mode output signal which is normalized.

54. A method for profile determination of an object to improve image quality as described in claim 52 wherein said step of focusing electromagnetic beam energy reflected from said plurality of points of said object is accomplished by optical lens devices, each of said optical lens devices optically coupled with an individual position sensitive detector to focus said reflected electromagnetic beam intensity on said individual position sensitive detector.

55. A method for profile determination of an object to improve image quality as described in claim 49 further comprising the step of:
positioning said gantry structure along different positions of said axial track which runs along a cranial-caudal axis of said object; and
wherein said step of storing and combining said locations of said plurality of points of said object to create a surface profile database of said object operates at each position of said gantry structure along said axial track to create successive surface profiles of said object.

56. A method for profile determination of an object to improve image quality as described in claim 55 further comprising the steps of:
scanning said object with said imaging surface based on radiated gamma rays for each position of said gantry structure along said axial track to generate image data; and
processing said image data to create an image of said object.

57. A method for profile determination of an object to improve image quality as described in claim 56 wherein said step of storing and combining said locations of said plurality of points of said object to create a surface profile database of said object further comprises the step of creating a body contour database from said surface profile database, said body contour database comprising successive surface profiles of said surface profile database, each of said profiles associated with each position of said gantry structure along said axial track.

58. A method for profile determination of an object to improve image quality as described in claim 57 wherein said step of storing and combining said locations of said plurality of points of said object to create a surface profile database of said object creates a surface profile of said successive surface profiles of said object at one position along said cranial-caudal axis while said step of scanning an image of said object with said imaging surface simultaneously scans an image of said object at a different position along said cranial-caudal axis of said object.

* * * * *